(12) United States Patent
Song et al.

(10) Patent No.: US 8,505,103 B2
(45) Date of Patent: Aug. 6, 2013

(54) HARDWARE TRUST ANCHOR

(75) Inventors: Zhexuan Song, Sunnyvale, CA (US); Jesus Molina, Sunnyvale, CA (US); Joseph Gordon, Sunnyvale, CA (US)

(73) Assignee: Fujitsu Limited, Kawasaki (JP)

( * ) Notice: Subject to any disclaimer, the term of this patent is extended or adjusted under 35 U.S.C. 154(b) by 432 days.

(21) Appl. No.: 12/556,148

(22) Filed: Sep. 9, 2009

(65) Prior Publication Data
US 2011/0060947 A1 Mar. 10, 2011

(51) Int. Cl.
*G11C 7/00* (2006.01)

(52) U.S. Cl.
USPC .............. 726/25; 726/22; 726/23; 726/24; 713/189; 713/190; 713/191; 713/193; 713/194; 705/51; 705/52; 705/53; 705/54; 717/168; 717/169; 717/170; 717/173

(58) Field of Classification Search
USPC ........... 726/22–25; 705/51–54; 713/189–194; 717/168–173
See application file for complete search history.

(56) References Cited

U.S. PATENT DOCUMENTS

| | | | |
|---|---|---|---|
| 7,131,143 B1 | 10/2006 | LaMacchia et al. | |
| 7,240,202 B1 | 7/2007 | Orman | |
| 7,380,119 B2 | 5/2008 | Bade et al. | |
| 2003/0145222 A1* | 7/2003 | Gittler et al. | 713/200 |
| 2005/0033987 A1 | 2/2005 | Yan et al. | |
| 2005/0039016 A1 | 2/2005 | Aissi et al. | |
| 2005/0235154 A1* | 10/2005 | Serret-Avila | 713/176 |
| 2007/0204153 A1* | 8/2007 | Tome et al. | 713/164 |
| 2008/0046581 A1 | 2/2008 | Molina et al. | |
| 2008/0046758 A1 | 2/2008 | Cha et al. | |
| 2008/0141024 A1 | 6/2008 | Ranganathan | |
| 2009/0012406 A1* | 1/2009 | Llewellyn et al. | 600/478 |
| 2009/0013406 A1* | 1/2009 | Cabuk et al. | 726/22 |
| 2009/0063857 A1 | 3/2009 | Bade et al. | |
| 2009/0089860 A1* | 4/2009 | Forrester et al. | 726/3 |
| 2009/0172781 A1 | 7/2009 | Masuoka et al. | |
| 2009/0193074 A1* | 7/2009 | Lee | 709/203 |
| 2009/0292919 A1* | 11/2009 | England | 713/168 |

OTHER PUBLICATIONS

Baldwin, et al. "Hardware Encapsulation of Security Services." Lecture Notes in Computer Science: Computer Security-ESORICS 2003 8th European Symposium on Research Computer Security [online], Gjovik, Norway, Oct. 13-15, 2003 [retrieved on Sep. 1, 2010], Proceeding, vol. 2808, pp. 201-216. Retrieved from the Internet: <URL:http://www.springerlink.com/content/2pkbfjc63rpbf2jd/>.

Baldwin, et al. "Hardware Security Appliances fro Trust."Lecture Notes in Computer Science: Trust Management, First International Conference [online], iTrust 2003 Heraklion, Crete, Greece, May 28-30, 2003 [retrieved on Sep. 1, 2010], Proceedings, vol. 2692, pp. 46-58. Retrieved from the Internet: <URL:http://www.springerlink.com/content/47fter7jyhfupk92/>.

(Continued)

*Primary Examiner* — Yin-Chen Shaw
*Assistant Examiner* — Fahimeh Mohamadi
(74) *Attorney, Agent, or Firm* — Staas & Halsey LLP

(57) ABSTRACT

A target computing environment is secured by a hardware trust anchor that provides a trust state of the target computing environment based upon a security audit of the target computing environment. And diagnosing the target computing environment can be diagnosed by the hardware trust anchor according to the security diagnostic information.

7 Claims, 10 Drawing Sheets

OTHER PUBLICATIONS

PCT International Search Report and the Written Opinion of the International Searching Authority dated Sep. 16, 2010 in the corresponding International Application No. PCT/US10/43550 (8 pages).
Shane Balfe et al. "Challenges for trusted computing." IEEE Security and Privacy, 6(6):60-66, 2008.
Michael Becher et al. "FireWire all your memory are belong to us." Proceedings of CanSecWest, 2005.
Tal Garfinkel et al. "Terra: a virtual machine-based platform for trusted computing." in SOSP '03: Proceedings of the nineteenth ACM symposium on Operating systems principles, pp. 193-206, New York, NY, USA, 2003, ACM.
Tal Garfinkel et al. "When virtual is harder than real: Security Challenges in Virtual Machine Based Computing Environments." In $10^{th}$ Workshop on Hot Topics in Operating Systems, 2005.
Trusted Computing Group. [Online] [retrieved on May 15, 2012] Retrieved from the Internet: <URL: https://www.trustedcomputing-group.org> (10 pages).
James Hendricks et al. "Secure bootstrap is not enough: shoring up the trusted computing base." In Proceedings of the 11th workshop on ACM SIGOPS European workshop. ACM New York, NY, USA, 2004.
Samual T. King et al. "SubVirt: implementing malware with virtual machines." In Security and Privacy, 2006 IEEE Symposium, p. 14, 2006.
Jonathan M. McCune et al. "Turtles all the way down: Research challenges in user-based attestation." In Proceedings of the Workshop on Hot Topics in Security (HotSec), Aug. 2007.
Trusted Computing Group. Trusted platform module (TPM) specifications. [Online] [retrieved on May 3, 2012] Retrieved from the Internet: <URL: https://www.trustedcomputinggroup.org/specs/TPM/> (1 page).
Steven J. Vaughan-Nichols. "Virtualization Sparks Security Concerns." Computer, 41(8):13-15, 2008.
Jesus Molina et al., "Using independent auditors as intrusion detection systems." in Proc. of the $4^{th}$ International Conference on Information and Communications Security (ICICS '02), pp. 291-302, Singapore, Dec. 2002.
Jesus Molina et al. "A mobile Trusted Platform Module (mTPM) Architecture." In Proc. of $2^{nd}$ Workshop and Advances in Trusted Computing (WATC06), 2006.

* cited by examiner

HARDWARE TRUST ANCHOR

FIELD

The embodiments discussed herein relate to security of a computer.

BACKGROUND

Antivirus and anti-malware tools work by executing a program in the target machine (computing device/computer), which collects data and attempts to detect malicious software. After this, the results are displayed using the target machine peripherals/resources (monitor, etc). However, there are problems with this approach. Firstly, the anti-virus software itself is likely to be the target and/or victim of virus and/or malware, thus unable to fulfill its duty. Secondly, the whole purpose of certain malware is to "sell" anti-malware by displaying messages like "Your computer is infected." Third, in case of a virtual machine on a machine, a user may have problems distinguishing between the different environments (VMs) residing in a single machine, and could easily be tricked into using a potentially corrupted environment instead of the correct one.

Users can become unlikely to believe the results of malicious software detection that is displayed on the screen, even if such results come from a genuine antivirus tool. One solution for this is to boot the infected machine from a different storage device of the infected machine, such as a CD, or a USB thumb drive, in relation to the hard disk drive (HDD), into a clean state. After that, the user starts scanning the HDD for the malicious software. However, this solution requires certain proficiency with computers, namely rebooting, and further the CD and the USB thumb drive only serve as a reboot function for rebooting the infected machine.

SUMMARY

It is an aspect of the embodiments discussed herein to provide a method, a machine (computing apparatus/device) and computer-readable medium thereof, verifying health or 'trust state' of a target computer system (target machine) according to a security audit of the target computer system. An aspect of an embodiment provides diagnosis of a trust state of a target computer system using a hardware (computing hardware) out-of-band (OOB) trust diagnoser as a hardware trust anchor, for example, an external hardware out-of-band trust diagnostic device, and/or a hardware isolated (in-band) trust diagnoser as the hardware trust anchor without another data communication connection in relation to the data communication connection with the target computer system, for example, an external hardware in-band trust diagnostic device. According to an aspect of an embodiment, the hardware out-of-band and/or in-band trust anchor is both trusted and verifies trust state of a target computer system. According to an aspect of an embodiment, the hardware trust anchor including an OOB and/or in-band trust anchor is external in relation to the target computer system as an external hardware trust anchor communicably connectable with the target computer system and/or integrated as an independent computing circuitry (a trust anchor chip) in the target computer system and/or as incorporated/implemented as part of Trusted Platform Module (TPM) of the target computer system, or any combinations thereof.

According to an aspect of an embodiment, the 'trust state' includes verifying trust state of the target computing system including a target virtual machine on the target computer system according to a security audit of the target computer system.

It is to be understood that both the foregoing general description and the following detailed description are exemplary and explanatory and are not restrictive of the invention, as claimed.

DETAILED DESCRIPTION OF EMBODIMENT(S)

Figure 1:
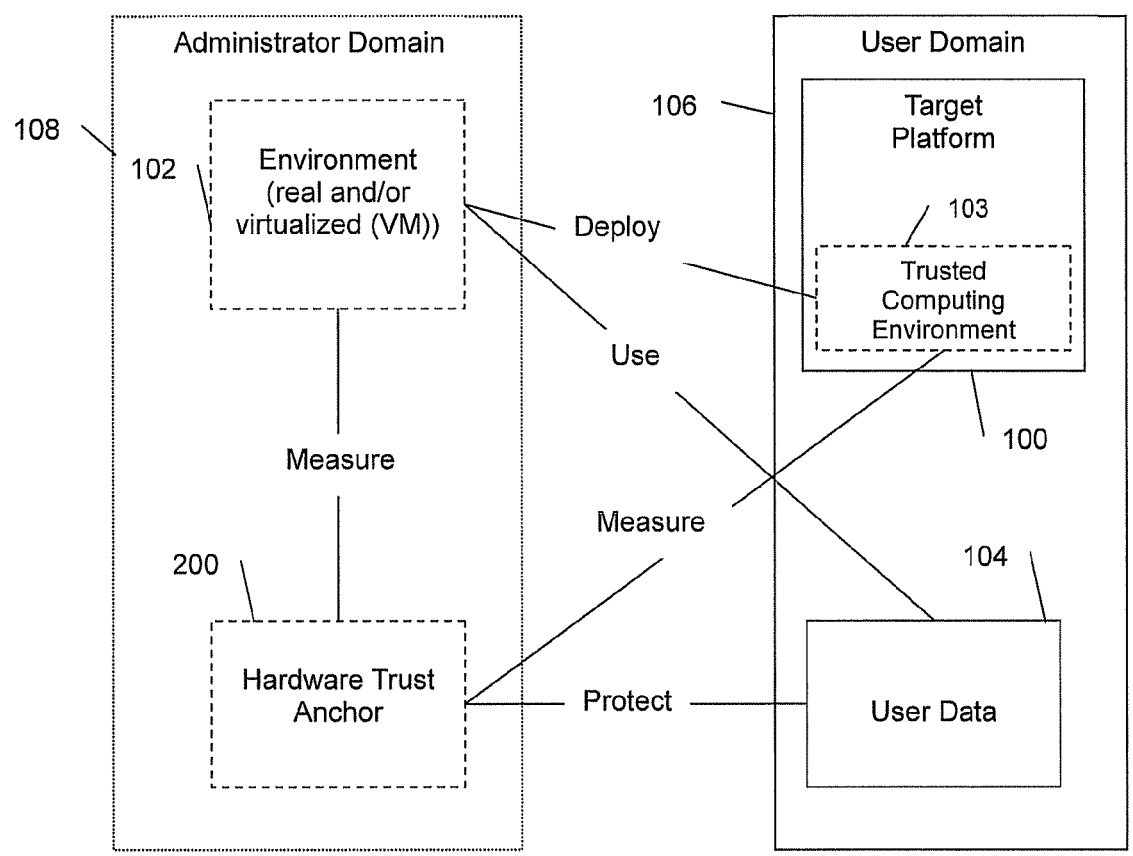
FIG. 1 is a diagram of functional and physical components of an embodiment of the present invention.

It is an aspect of the embodiments discussed herein to provide a method, a machine (computing apparatus/device) and computer-readable medium thereof, verifying health or 'trust state' of a target computer system (target machine) according to a security audit of the target computer system. An aspect of an embodiment provides diagnosis of a trust state of a target computer system using a hardware (computing hardware) out-of-band (OOB) trust diagnoser as a hardware trust anchor, for example, an external hardware out-of-band trust diagnostic device, and/or a hardware isolated (in-band) trust diagnoser as the hardware trust anchor without another data communication connection in relation to the data communication connection with the target computer system, for example, an external hardware in-band trust diagnostic device. According to an aspect of an embodiment, the hardware out-of-band and/or in-band trust anchor is both trusted and verifies trust state of a target computer system. According to an aspect of an embodiment, the hardware trust anchor including an OOB and/or in-band trust anchor is external in relation to the target computer system as an external hardware trust anchor communicably connectable with the target computer system and/or integrated as an independent computing circuitry (a trust anchor chip) in the target computer system and/or as incorporated/implemented as part of Trusted Platform Module (TPM) of the target computer system, or any combinations thereof. According to an aspect of an embodiment, the 'trust state' includes verifying trust state of the target computing system including a target virtual machine on the target computer system according to a security audit of the target computer system.

In case of virtual environments, when current security techniques are applied to portable virtual environments, most techniques prove to be ineffective. While traditional security tools could be adapted, the modifications may come at a prohibitive cost, and at the expense of usability and reduced protection. The embodiments provide an alternative solution: a hardware trust anchor, which can be external and/or integrated with the target computer system. This hardware trust anchor, as with nautical anchors, protects the virtual environment from common threats by firmly grounding the virtual machine to a hardware device. The embodiments use a hardware trust anchor with virtualized systems. The trust anchor protects a virtual machine and provides a mechanism for asserting the fidelity of the underlying platform where the virtual machine will be deployed. Perhaps more importantly, the hardware trust anchor informs the user of the current "trust state" of the target system thereby improving security awareness and reinforcing best practices. An example candidate hardware trust anchor device is described to provide optimal security without sacrificing the flexibility of portable virtual environments. According to an aspect of an embodiment, the user transparently works on the same computer with two separate environments, one environment bound to the trust anchor that enforces strict security policies, for example, specifically launched to perform a target secured operation or target secured application (e.g., banking) alone or with another computing device, and the other totally unmanaged and modifiable by the user.

Virtualization technology as mobile computing has become a mixed blessing for companies that require mobile computing. Mobile computing herein refers to virtualization of a computing environment for transporting/transferring among computer systems, for example, by network transmission, by computer readable recording media, etc. On one hand, virtual machines (VMs) provide increased flexibility for users allowing them not only to transport their whole working environment (OS, applications) as files, but also to share and modify the working environment with ease. On the other hand, the very nature of this new technology requires a paradigm shift in how virtual platform are secured. See Tal Garfinkel and Mendel Rosenblum, *When Virtual is Harder than Real: Security Challenges in Virtual Machine Based Computing Environments*, in 10th Workshop on Hot Topics in Operating Systems, 2005; and Steven J. Vaughan-Nichols, *Virtualization Sparks Security Concerns*, Computer, 41(8): 13-15, 2008. The same flexibility that allows users to create and potentially share thousands of virtual machines, also creates new security threats and management nightmares. In addition, virtualization software in the target platform where the virtual machine is deployed may be corrupted, leaking private data to other virtual machines deployed on the same target platform. Unfortunately, current antivirus and other security related products meant to protect virtual machines are unable to identify root kits or malware that target the virtualization layer, as discussed in Samual T. King and Peter M. Chen, *SubVirt: implementing malware with virtual machines*, in Security and Privacy, 2006 IEEE Symposium on page 14, 2006. Furthermore, a user may have problems distinguishing between the different environments—real environment vs. authentic VM vs. fake/phony/malicious VM—residing in a single machine, and could easily be tricked into using a potentially corrupted environment instead of the correct one. Replicating a virtual machine can be very simple, and creating malicious environments that look identical to the user is hence feasible for even novice attackers. Aiding the user in distinguishing among different environments is one of the problems resolved by the embodiments.

Hence, it is reasonable to perform a thorough review of the current security design before adapting it to virtual machines. In particular, as the virtual machine cannot inspect the target platform directly, the target platform, where the virtual machine is to be deployed, needs to be reliably attested beforehand. Trusted computing can fulfill this need and shows great promise for providing reliable measurements for (remote) attestation—see *Trusted Computing Group*, [Online] <URL: https://www.trustedcomputinggroup.org>. Trusted Computing utilizes chained measurements stored in a cryptographic repository that can be provided on demand to third parties for attestation purposes. However, trusted computing is not without its own problems—see Shane Balfe, Eimear Gallery, Chris J. Mitchell, and Kenneth G. Paterson. *Challenges for trusted computing*, IEEE Security and Privacy, 6(6):60-66, 2008. In most cases there is no easy mechanism to reliably transmit the measurements to end users, since if the target machine is not safe, one cannot assure the proper message will displayed. Additionally, the chain of trust must start from somewhere, and that requires some sort of infrastructure. Interestingly, both virtualization and trusted computing share a similar problem: the lack of an "anchor" that will collect and verify measurements, and provide reliable and understandable information to users. To solve these problems, the embodiments provide a hardware trust anchor. As with the nautical anchor of a vessel, the goal of a hardware trust anchor is to keep the target computing environment "immobile" by preventing modifications, thus providing a point of support for the architecture.

According to an aspect of an embodiment a hardware trust anchor provides one or more of 1) obtaining and/or verifying measurements of a target computing system as a 'trust state' of the target computing system, 2) in case of a VM, the data necessary to personalize the VM (or even the image of the whole VM), 3) be able to deploy the VM environment securely into the target platform; or 3) report faithfully the 'trust state' of both the VM and the trusted computing base (TCB) (target computing system) where the VM is deployed, or any combinations thereof. While a range of technologies might be used to implement the measurement mechanisms required by a hardware trust anchor, a combination of a hardware trust anchor and trusted computing technologies will provide good implementation results—see generally, Jonathan M. McCune, Adrian Perrig, Arvind Seshadri, and Leendert van Doorn, *Turtles all the way down: Research challenges in user-based attestation*, in Proceedings of the Workshop on Hot Topics in Security (HotSec), August 2007; and Bryan Parno, *Bootstrapping trust in a "trusted" platform*, in HOTSEC'08: Proceedings of the $3^{rd}$ conference on Hot topics in security, USENIX Association, pages 1-6, Berkeley, Calif., USA, 2008.

Security audit refers to one or more of confirmation, performing and/or monitoring of a measurement of a target machine and/or a VM, trust state of the target machine and/or the virtual machine on the target machine, grounding (or binding) of a virtual machine to the hardware trust anchor (i.e., binding refers to communicably connecting, enforcement, monitoring, and/or reporting (feedback) by the hardware trust anchor of security policies via and in relation to a real and/or a VM environment, which for example include strict limitations on modifications and/or executions in the real/VM environment), safe storage of keys/certificates, enforcement of assignment of the hardware trust anchor to a specific real/VM environment for communication, authenticity of update, authentication of user and/or administrator, verification and/or installation of a trusted computing base (TCB) on the target machine, security diagnosing, security remediation, or any combinations thereof. Trusted computing base (TCB) refers to required security control of or providing hardware and/or software elements for maintaining a trusted state in the target computer system (e.g., such elements to be security audited to be/maintain trusted can include (without limitation) TPM, video cards, interfaces, peripherals, memory, BIOS, storage devices, virtualization, etc.)

A measurement refers to a fixed-length digital representation of an input data sequence of any length. A measurement can be, for example, a digital representation of whole and/or portion(s) of an operating environment (e.g., OS, data in computer readable media (memory, hard disk, etc.), data about configured peripherals/devices) and/or of files (e.g., files of software applications, data files) of a target machine, or in case of a VM an input virtual machine (VM) image including any VM hard disk and/or memory image, and/or files (e.g., files of software application, data files) of any VM on the target computing device, and used for verifying the target machine or target VM of the target machine as a 'trust state' of the target machine and/or target VM, for example, by comparison against another measurement(s) to detect any changes in the target machine and/or in the target VM in the target machine.

Trusted Computing: The foundation of TCG (Trusted Computing Group) is the Trusted Platform Module (TPM) (Trusted Computing Group. Trusted platform module (TPM) specifications. [Online] <URL: https://www.trustedcomputinggroup.org/specs/TPM/>, a hardware root-of-trust. The most common implementation of a TPM is a chip physically attached to a computer. The TPM is accessed by software using a well defined command set. Through this command set, the TPM provides cryptographic functionality such as encrypting, signing, key generation and random number generation. TPM could also store a limited amount of information in nonvolatile memory. Additionally, the TPM contains a set of extensible Platform Configuration Registers (PCRs). As of the latest version, a total of 24 PCRs exist on the TPM. PCRs are used to store measurements on the current status of the platform. PCRs are reset when the system powers up and can only be reset or extended, but never directly modified. The extension of PCR can be performed using a cryptographic equation (1):

$$\text{Extend}(PCR_N; \text{value}) = \text{Hash}(PCR_N \| \text{value}) \quad (1)$$

The ‖ sign stands for concatenating the two arrays, while "Hash" refers to applying cryptographic hash function, in particular SHA1. The first measuring entity of the target platform is trusted by default, as it is not previously measured by any other entities. This early measuring entity is called the Core Root of Trust (CRT) for measurement. For enhanced security, the CRT may be stored inside the TPM chip itself. Thereafter, all software entities launched are expected to continue the chain of trust by extending the PCRs before launching any other software. Each measurement is recorded and could be cryptographically verified using the PCRs by a verification party. The action of sending these measurements to a verification party for verification is called attestation. Attestation keys can be used to sign the measurements inside the TPM. Hence, the TPM could be seen as a cryptographic repository for the measurements of the target machine.

Desktop Virtualization: Virtualization, a technology which allows a user to deploy a full OS on top of another software, provides an improved user experience for mobile users. The virtualization software partitions the resources on the hardware, and enable the execution of multiple environments. This virtualization software is usually referred as the Virtual Machine Monitor (VMM) or hypervisor. The implication for this technology to a server administrator is immediate, as the administrator could maximize hardware resources by co-locating several computing environment sites in a single hardware. For desktop computing, it allows the user to carry the full operating system between different platforms.

Initially some security benefits of virtualization on desktops, which are suggested in Tal Garfinkel, Ben Pfaff, Jim Chow, Mendel Rosenblum, and Dan Boneh, *Terra: a virtual machine-based platform for trusted computing*, in SOSP '03: Proceedings of the nineteenth ACM symposium on Operating systems principles, pages 193-206, New York, N.Y., USA, 2003, end up opening a set of new security concerns—see Tal Garfinkel and Mendel Rosenblum, *When Virtual is Harder than Real: Security Challenges in Virtual Machine Based Computing Environments*, in 10th Workshop on Hot Topics in Operating Systems, 2005; and Steven J. Vaughan-Nichols, *Virtualization Sparks Security Concerns*, Computer, 41(8): 13-15, 2008, which in most cases cannot be handled under current security tools and technologies. One of the most important factors for security in virtualization is to maintain the integrity of the target platform including real/VM environment, which can be achieved by performing measurements of the target platform including measurement of any virtual environment.

An embodiment of a hardware trust anchor, including the techniques developed to perform the distinct measurements and communications, is described next.

According to an aspect of an embodiment, data leakage is prevented when a mobile environment (i.e., a VM) is used in a known but possibly corrupted machine (target machined). The simplest example is when an employee launches a work environment in a platform outside the company's perimeter, such as the employee home computer. Another possible scenario is to create a "cheat proof" gaming client for online games. A benefit of the embodiments is to emphasize user experience, by improving the user's security awareness while maintaining the transparency of day-to-day tasks. The user does not need to modify the user's other environments, which may contain unsafe software, as long as the target platform provides complete isolation between environments. The embodiments also do not require complex architectures, such as PKI or privacy CAs—see TCG Infrastructure Workgroup, *Subject key attestation evidence extension*, [Online] <URL: https://www.trustedcomputinggroup.org/specs/IWG/IWG SKAE Extension 1-00.pdf>, June 2005—although PKI or privacy CAs may be used for certain purposes, such as scalability of the solution. The embodiments also do not require a constant Internet connection to utilize the environment in a positive case—see Samuel T. King and Peter M. Chen, *SubVirt: implementing malware with virtual machines*, in Security and Privacy, 2006 IEEE Symposium on, page 14, 2006—although Internet access, for example, an OOB data communication connection, may be mandated by policy, either constantly or intermittently for updates.

The threat model can include 1) An attacker modifying the target platform before the VM environment is launched; 2) An attacker misleading the user into selecting a similar-looking but incorrect or phony or trojan horse VM environment; 3) A user mistakingly agreeing to launch a VM environment in an unsafe target platform; and 4) The trust anchor being obtained and used by an unauthorized user.

Components and actors in design of the embodiments:

FIG. 1 is a diagram of functional and physical components of an embodiment of the present invention. The embodiments include four main components: the target platform 100, which is a target computer or computing machine including the software environment 102 as a component. The software environment 102 can be real and/or virtualized as a virtual machine (VM). Other two components are the user data 104, and the hardware trust anchor 200. Separating the environment 102 and the user data 104 is necessary to establish policies on user data 104 while maintaining a stable environment 102. The concept can be understood readily if compared with a game console system, such as a SONY PLAYSTATION. A SONY PLAYSTATION user can launch (largely) immutable environments (games) in (largely) immutable platforms (the game console) while still personalizing the system by storing game data into an external memory stick or internal memory. For gaming consoles the only necessary requirement is that the environment (games) should not be easily replicated. In addition, the present embodiments also need to ensure that the data is protected from leakage.

Next, the four main components of the architecture of the embodiments is described. The target platform 100 is the computer where the software environment 102 is deployed (executable). The target platform 100 includes the hardware and software necessary to launch a "trusted computing environment" 103 called the trusted computing base (TCB) (see James Hendricks and Leendert van Doorn, *Secure bootstrap is not enough: shoring up the trusted computing base*, in Proceedings of the 11th workshop on ACM SIGOPS European workshop. ACM New York, N.Y., USA, 2004), and perhaps other environments and hardware peripherals (according to an aspect of an embodiment, for maximum security all hardware should be considered part of the TCB). The TCB of the target platform 100 includes virtualization technology to launch the virtual machine, such as a virtual machine monitor (VMM). Additionally, the TCB should provide isolation between environments 102a-n, report integrity of the TCB faithfully to the hardware trust anchor 200, include safe storage for keys and enforce the assignment of the trust anchor to a specific environment for communication.

The environment 102 can be real and/or a virtual machine containing the software, operating system and non-transient data required for the user to perform activities. According to an aspect of an embodiment, the VM is only modifiable through an updating process involving the hardware trust anchor. Otherwise, the virtual machine is immutable. The environment 102 contains mechanisms to communicate with the hardware trust anchor 200, for reporting its state and storing the user created data.

The user data 104 includes user related data, including any data, such as documents created and modified by the user. These documents abide by the policies set forth by the administrator, which will be enforced by the environment 102 and the hardware trust anchor 200. The user data 104 could be stored and protected either within the hardware trust anchor, within the target platform 100 and/or reside remotely in other computers.

The hardware trust anchor 200 can be an external entity from the target platform 100 and/or an internal independent integrated entity of the target platform 100 used to verify the target platform 100, secure user data 104, authenticate the user and administrator, and convey trust state information of the target platform 100 and/or the environment 102 to the user. The hardware trust anchor 200 requires a communication channel to collect security related audit data, such as measurements, from the target platform 100, and for delivering any user data 104 to the environment 102.

According to an aspect of an embodiment, the hardware trust anchor 200 can independently audit the target system 100, independent security auditing referring to actively collecting audit related data with minimized or without target platform 100 interaction. This independent security auditing, however, is only possible by plugging the hardware trust anchor 200 into direct access buses, such as PCI, or FIREWIRE, where it is possible to access the target platform's 100 resources (memory, hardisk) via specialized transfers, like DMA. See, Jesus Molina and William A. Arbaugh, "Using independent auditors as intrusion detection systems," In Proc. of the 4th International Conference on Information and Communications Security (ICICS'02), pages 291-302, Singapore, December 2002; and Jesus Molina, Houcheng Lee, Sung Lee, and Zhexuan Song, *A Mobile Trusted Platform Module (mTPM) Architecture*, in Proc. of 2nd Workshop on Advances in Trusted Computing (WATC06), 2006; and Michael Becher, Maximillian Dornseif, and Christian N. Klein, *FireWire all your memory are belong to us*, in Proceedings of CanSecWest, 2005. However, use of direct access buses might not be advisable depending upon application, because opening these buses to external peripherals for auditing could also create an open door for potential security threats, since the hardware trust anchor may not only read but also write into the target platform's 100 resources. According to an aspect of an embodiment, the hardware trust anchor will receive security audit data, such as measurements from the platform 100 through a trusted channel such as the USB. The security audit data, such as the measurements should provide authentication to prove the security audit data are genuine. The hardware trust anchor can display to the user the trust state information or results of the security audit independently from the target platform 100, for example, by displaying in real-time (live) the trust state or security audit results on the trust anchor 200 and/or on the target platform 100 and/or in other out-of-band display. The clearer the information is presented, the more likely security problems will be prevented.

The embodiments are based on implementation flexibility, so the different components may be implemented using different technologies. Two existing actors can be in the architecture of the embodiments: The user 106 and the administrator 108. The user 106 has initial control over the target platform 100 and over user data 104, and will be utilizing the environment 102 to work with the user data 104. The administrator 108 creates the environment 102, provides and sets up the hardware trust anchor 200 and makes sure the correct trusted computing base exists on the target platform 100 controlled by the user/owner 106. The relationship between the different components can be seen in FIG. 1, where the components controlled by the user 106 are represented by solid lines and the components controlled by the administrator 108 are represented with dashed lines.

Figure 2:
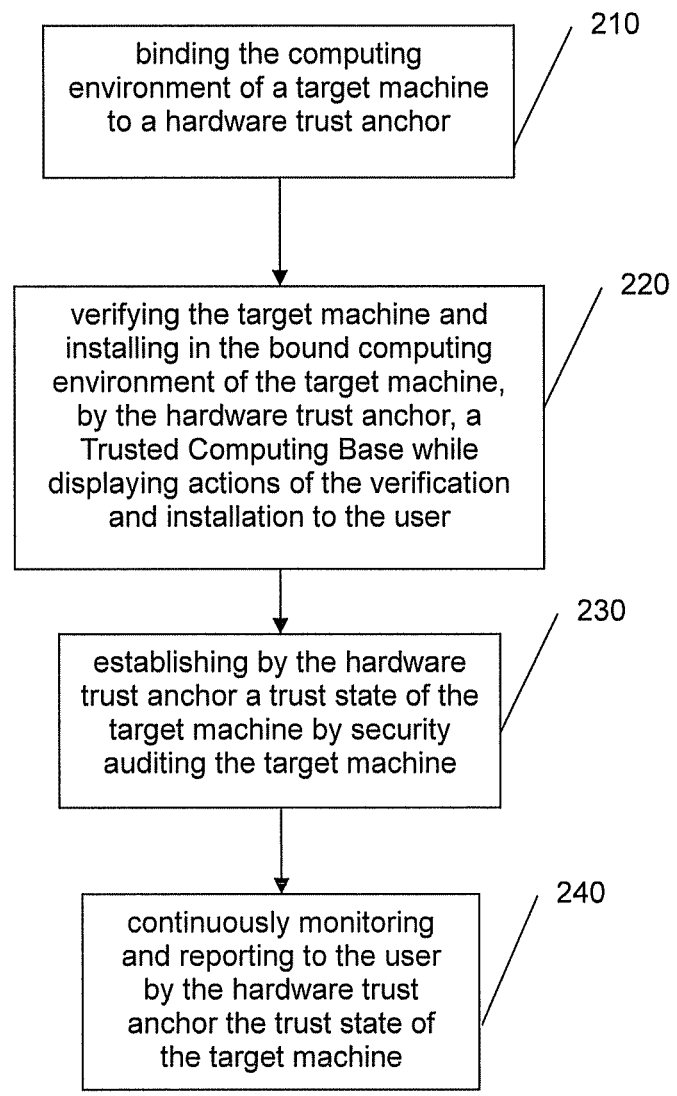
FIG. 2 is a flowchart of reporting trust state of a target machine, according to an embodiment of the present invention.

FIG. 2 is a flowchart of reporting trust state of a target machine, according to an embodiment of the present invention. In the initial phase 210 the administrator 108 personalizes the trust anchor 200 to the user 106 and binds a computing environment, for example, the environment 102 to the hardware trust anchor 200. In the second phase 220, the user 106 utilizes the hardware trust anchor 200 to verify and install (if necessary) the required TCB 103 to the target platform 100. This operation 220 can also be performed directly by the administrator. After the second phase 220, the user 106 can utilize the target platform 100 with the environment 102.

In the second phase 220, the hardware trust anchor 200 first verifies the target platform 100 where the environment 102 is to be launched. As the TCB 103 is small, the target platform 100 should be in a limited set of states, which have been previously stored in the hardware trust anchor 200. In the second phase 220, the target platform 100 as a second operation may verify the integrity of the hardware trust anchor 200 to determine if it is a trusted peripheral or not. The second phase 220 verifications of the target platform 100 and the hardware trust anchor 200 may be performed in any order and in any combinations. If any of these two verifications of the target platform 100 and the hardware trust anchor 200 fail, the hardware trust anchor 200 will perform diverse actions depending on policy as discussed herein. Regardless of the result, the actions performed by the hardware trust anchor should be displayed to the user 106.

Upon successful verification, at 230, the hardware trust anchor 200 executes a security audit of the target platform 100, for example, the hardware trust anchor 200 controls so the software environment 102 is measured by the target platform 100 to be checked by the hardware trust anchor 200. Once the 'trust state' of the target platform 100 is established, at 240, the environment 102 will then become immutable by the trust anchor 200 continuously monitoring and reporting to the user the trust state of the target platform 100. For example, at 240, the hardware trust anchor 200 can ensure that only the previously measured environment 102 have access to the user data 104.

According to an aspect of an embodiment, a measurement might be complex or time consuming, as the environment 102 can be a large VM. Measurements of large virtual machines are discussed herein and in the copending U.S. patent application Ser. No. 12/246,144, which is incorporated herein by reference.

At 210, as part of binding, the target platform 100 assigns the hardware trust anchor 200 only to the software environment 102, either real or virtual, launched at 210, hence forbidding other, for example, subsequently launched real and/or virtual software environments, in the target platform 100 from communicating with the hardware trust anchor 200. At 230, after successful user authentication, the user data is unlocked, making documents available and personalizing the environment for the user 106.

At 240, the software environment 102 will communicate the security state to the hardware trust anchor 200 (e.g. programs launched, etc), so an attacker will not be able to fool the user 106 into utilizing a similar but malicious environment on the target platform. According to an aspect of an embodiment, any data created in the (safe or trusted) environment 102 will automatically be stored in the hardware trust anchor 200 to prevent misuse by other software environments and possible data leakage.

So far in a policy including two possibilities (allow or deny) has been described. The hardware trust anchor 200, however is not limited to this black and white approach. For example, the hardware trust anchor 200 could select a proper environment depending on the software audit results, for example, measurements received from the target platform 100, or selectively release user data depending on policy. Thus, the hardware trust anchor is capable of implementing a richer security policy and add flexibility to the administrator.

Once the user 106 is done working with the environment 102, the user 106 should remove the hardware trust anchor 200 from the target platform 200, which in turn should erase the memory traces left by the environment 102 (e.g. shut the environment 102 down, reboot the environment 102).

Figure 3A:
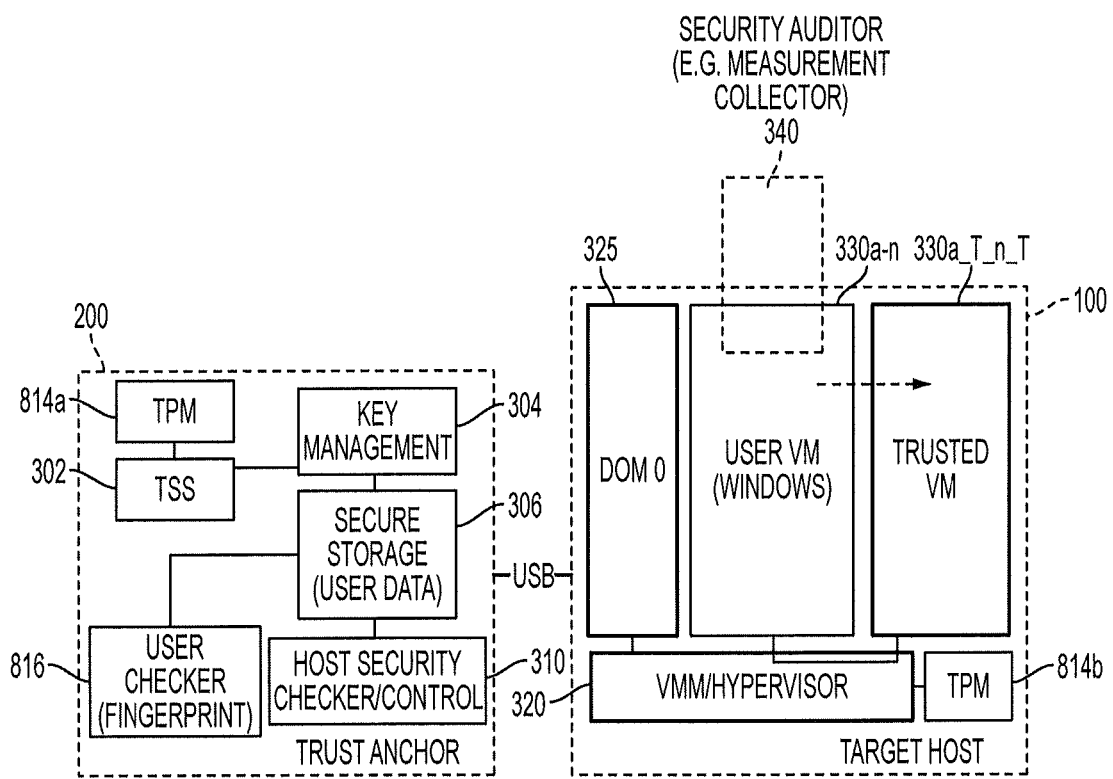
FIG. 3A is a diagram of a computer system according to an embodiment of the present invention.

FIG. 3A is a diagram of a computer system according to an embodiment of the present invention. The hardware trust anchor 200 includes a TPM 814a, a Trusted Computing Group (TCG) Software Stack (TSS) 302, key management software/hardware 304, secure storage 306 storing data, for example, user data 104, a user checker/authenticator 816 (software and/or computing hardware), such as a fingerprint/palm sensor and authenticator, and a host security checker 310. The host security checker 310 security audits, for example, controls collection of and/or collects measurements of the target platform 100. The hardware trust anchor 200 can be external or internal in relation to the target platform 100.

In FIG. 3A, the target host 100 includes a virtualized environment 102. In a non-limiting example, the target host 100 executes a virtual machine monitor (VMM) and hypervisor 320 by XEN, which includes the first guest virtualized operating system "domain 0" or domain zero (Dom 0) 325 that is booted automatically when the hypervisor 320 boots. Dom 0 is given special management privileges and direct access to the physical hardware. After Dom 0, other guest virtualized operating systems can be setup or launched as user virtual machine(s) (VMs) 330a-n. The user VMs 330 can be any operating system, such as MICROSOFT WINDOWS, APPLE OS, LINUX, etc. When at 230 the target host 100 is security audited (e.g., measured), a user VM 330a becomes a trusted VM 330a_T. A launched security auditor 340 can security audit the target host 100, for example, by obtaining or executing the measurements on the target host 100. According to an aspect of an embodiment, the host security checker/control 310 and security auditor 340 can be any combination of one or more software executable by any combination of one or more computer processors of the trust anchor 200 and/or target host 100.

For the user experience the embodiments focus on an enterprise environment 102, where a user wants to utilize a work environment on a laptop or on a personal desktop. A goal is to secure the mobile virtual environment 102 by making policy decisions transparent but not hidden to the user, keeping the user informed completes the chain of trust and reinforces good security practices.

The user first attaches or switches on the hardware trust anchor (for example, the external K9 mobile server discussed herein) into a USB port of the selected target machine 100. The target machine 100 contains the required keys and trusted computing base (TCB) (methods and/or controlled or provided hardware/software components) to perform the initial configuration, namely operation 220 in FIG. 2, will be discussed later). According to an aspect of an embodiment, in FIG. 3, the TCB includes the hypervisor 320, the Dom0 325 and BIOS of the target platform 100.

Figure 3B:
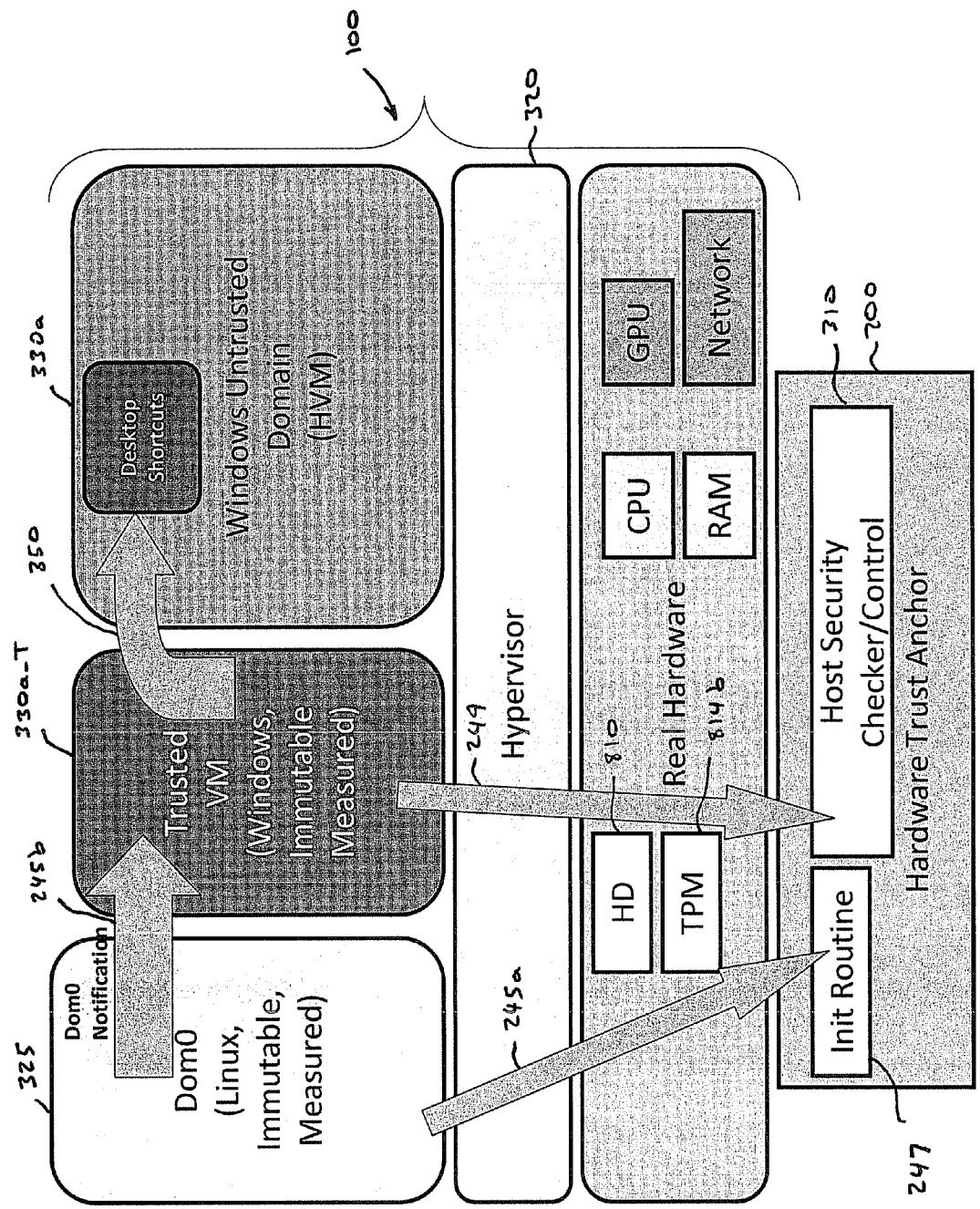
FIGS. 3B-3C are state diagrams of the computer system in FIG. 3A, according to an embodiment of the present invention.
Figure 3C:
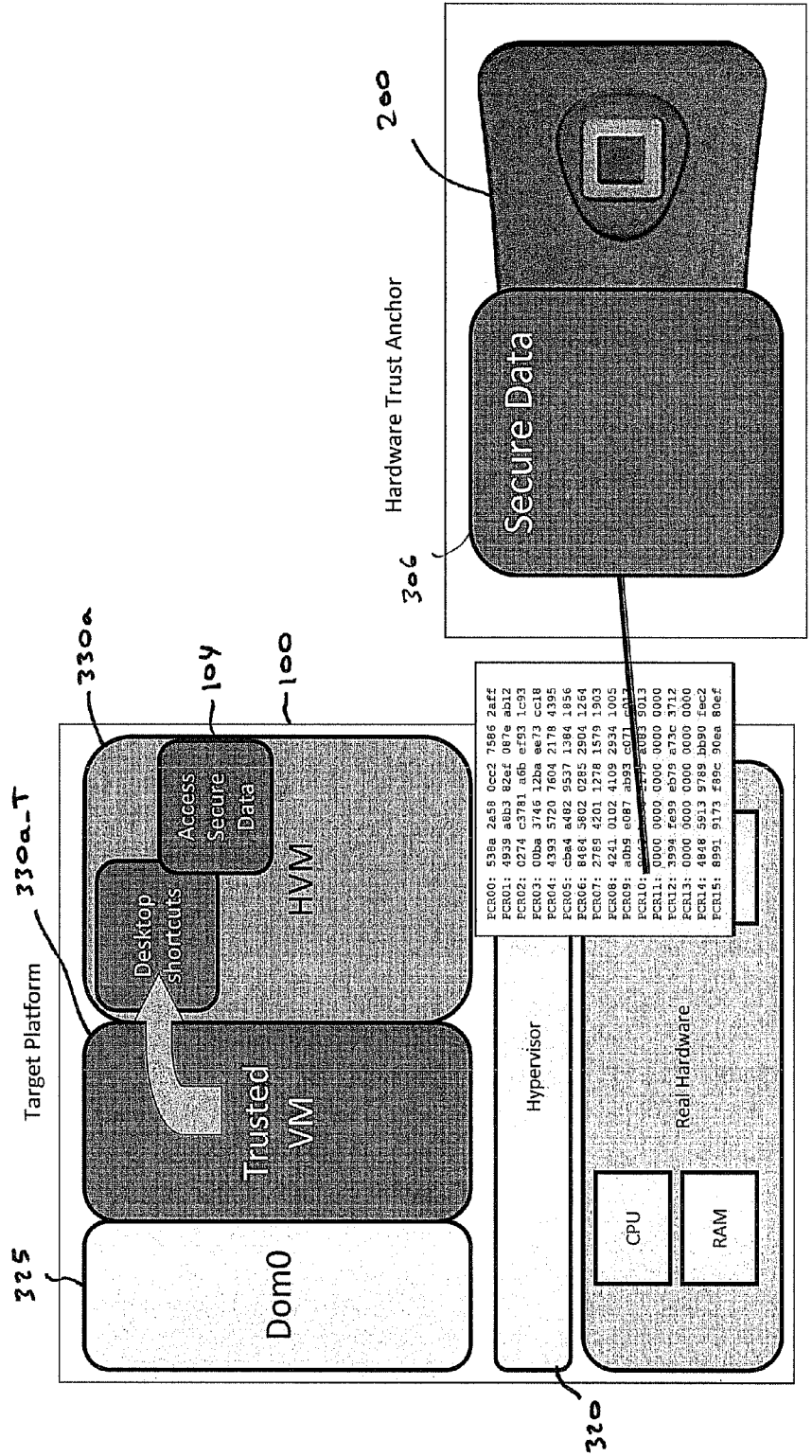

FIGS. 3B-3C are state diagrams of the computer system in FIG. 3A, according to an embodiment of the present invention. The work environment, denoted as Trusted Virtual Machine in this section (TVM) 330a_T coexists with the user environment, referred as the User Virtual Machine (UVM) 330a. Before connecting the hardware trust anchor 200 to the platform 100, the TVM 330a_T remains transparent to the user, as so is the entire TCB. The virtual machine technology remains transparent to the user 106, giving the user the feeling the user is working in a machine with a single OS executing directly on the physical hardware. This feeling is reinforced by near-native speeds of the UVM 330a.

After the hardware trust anchor 200 is plugged in or turned on/connected (as the case may be), the Dom0 detects the hardware trust anchor 200 and at 245a, in cooperation with the initialization routine 247 of the hardware trust anchor 200, Dom0 launches 245b a virtual machine 330a. At 249, the TCB in cooperation with the security auditor 340 and/or with host security checker/control 310 measures and/or sends the measurements of the target platform 100 to the hardware trust anchor 200. If the hardware trust anchor 200 correctly verifies the measurements, the virtual machine 330a can be deemed or is changed to a trusted state as a TVM 330a_T, and a message is displayed to the user 106 both in the hardware trust anchor 200 and by the TVM 330a_T. Once the hardware trust anchor 200 verifies the measurements, at 350, the TCB can allocate TVM 330a_T shortcuts on the UVM 330a desktop. At the same time, the hardware trust anchor 200 requests biometric authentication from the user, for example, by user checker 816. Upon a correct user authentication, the user data 306 is unlocked, and shortcuts to TVM programs and user data appear on the desktop. The time between user authentication and shortcuts from the TVM 330a_T appearing in the UVM 330a is around 5-10 seconds. This includes all verifications by the hardware trust anchor 200.

When the user clicks on one of the new shortcuts, a program is launched in the TVM 330a_T, and the user can interact with it in the UVM 330a. While the user works with TVM 330a_T based applications, the hardware trust anchor 200 displays the same icon, assuring the user is working in a trusted space. While the two VMs 330a and 330a_T are visually merged on the same desktop, the isolation enforced by the TCB still exists between environments. For example, a keylogger as a malicious software installed on the UVM 330a will not be able to intercept information typed inside programs launched by the TVM 330a_T. Also, a cross site scripting attack in a UVM 330a based browser will not affect the TVM 330a_T based browser, even if both are open at the same time. If a program is closed in the TVM 330a_T the related icon on the hardware trust anchor 200 disappears, informing the user this application is no longer running in the TVM 330a_T.

The hardware trust anchor 200 acts like a "compass," letting the user 106 know which programs are bound to the hardware trust anchor 200. In addition, only programs running in the TVM 330a_T have access to user data 306 stored in the hardware trust anchor 200, so work documents stored in the hardware trust anchor 200 will be only available through the TVM 330a_T.

If, at 230, the hardware trust anchor 200 does not receive measurements, for example, after 5 seconds, the hardware trust anchor 200 will notify the user and perform remediation procedures, such as start acting as a USB thumbdrive, allowing the user to launch the Xclient/Xserver mode of operation for regular work. If, at 230, the measurements are incorrect, the hardware trust anchor 200 will also start a remediation process, for example, in case of an out-of-band hardware trust anchor utilizing the OOB connection or in case of an in-band hardware trust anchor utilizing the target platform machine 100 as an "untrusted" hop, to access an administrator site server (heath check server) to discover if the unknown measurements are valid. The administrator site can sign this measurement with a private key, and the hardware trust anchor 200 can verify the results by utilizing an embedded public key from the administrator. The technical details of an implementation are discussed next.

Figure 4:
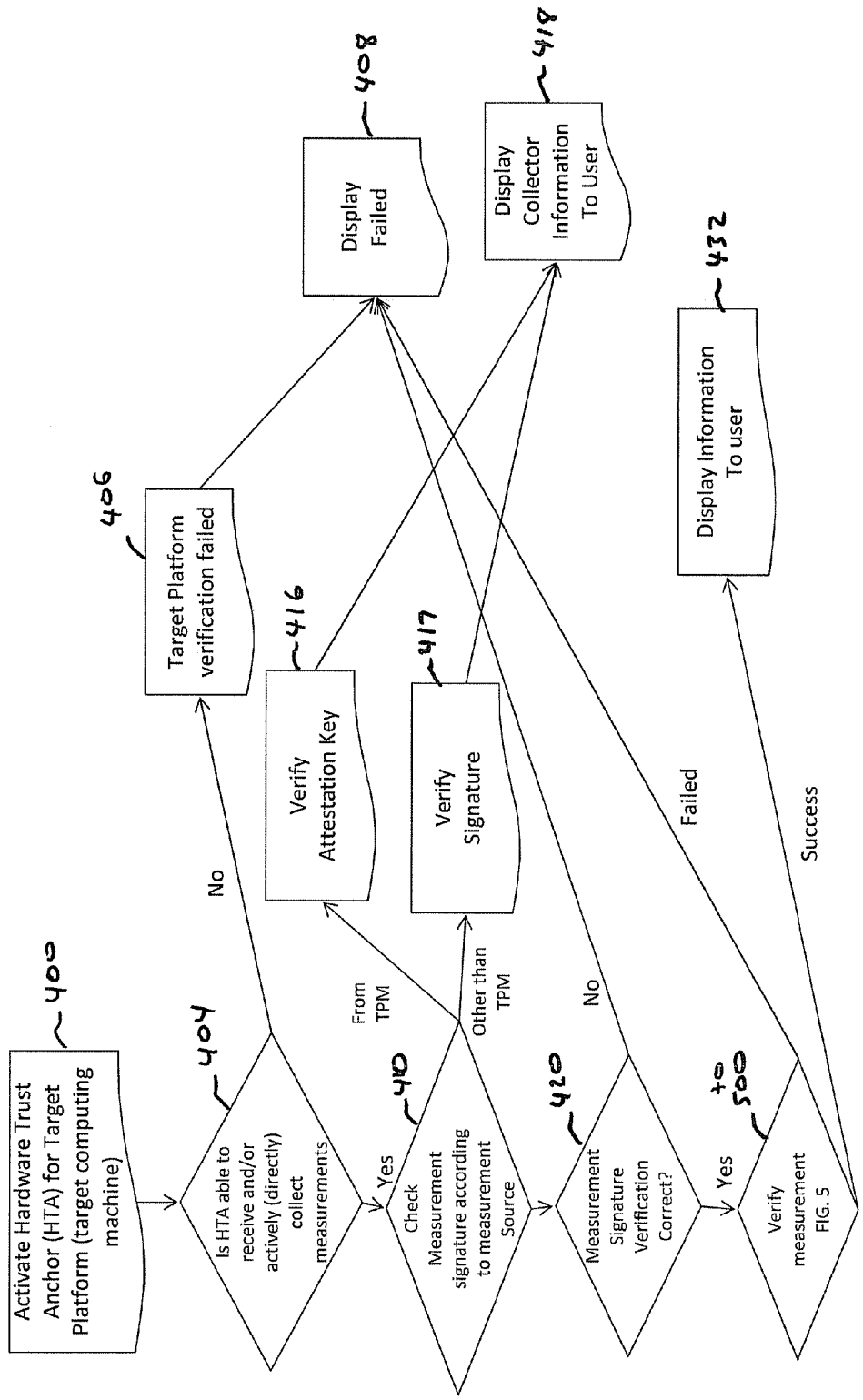
FIGS. 4-6 are flow charts of diagnosing a target computer with an external hardware trust anchor device, according to an embodiment of the present invention.
Figure 5:
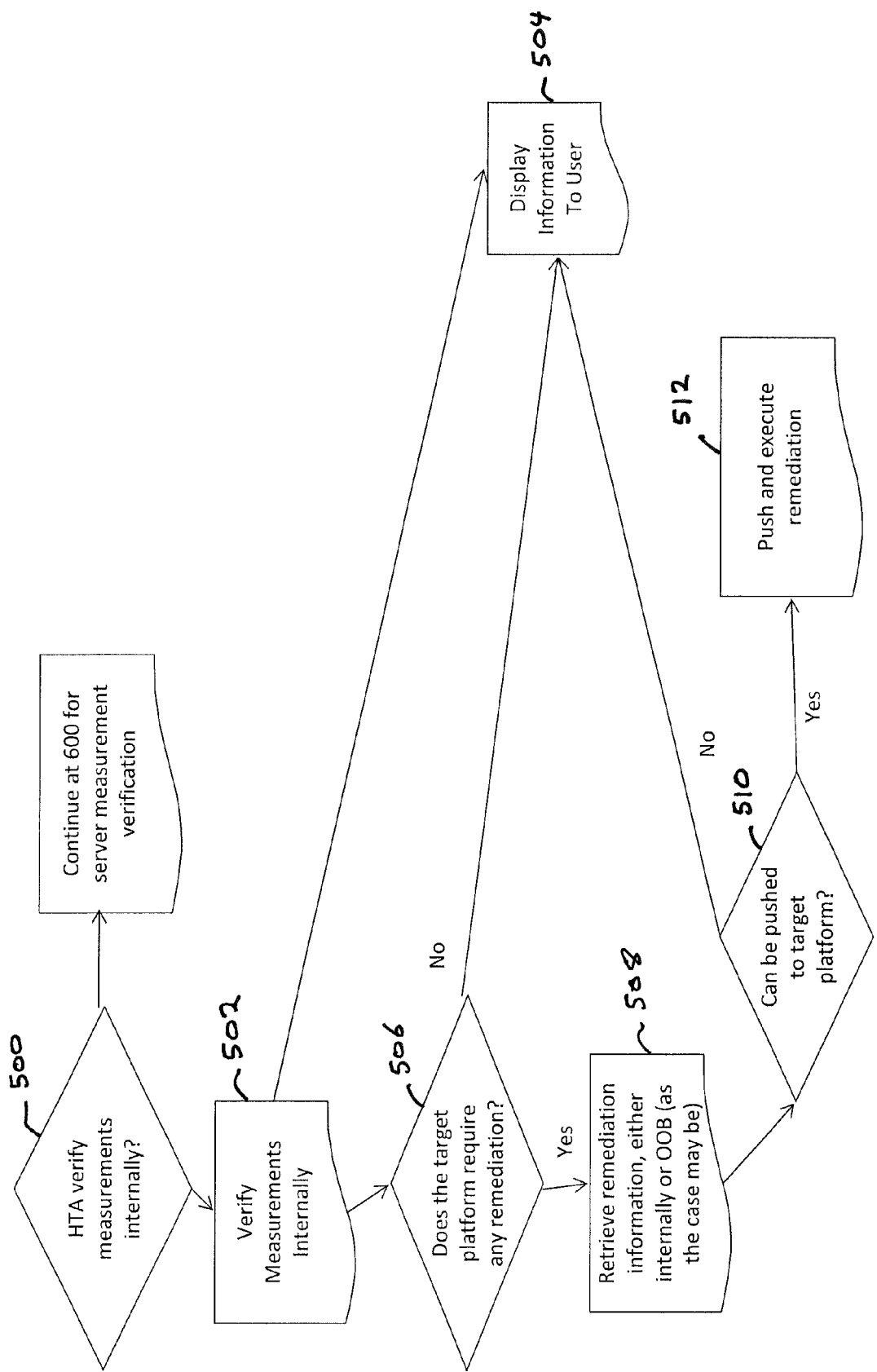
Figure 6:
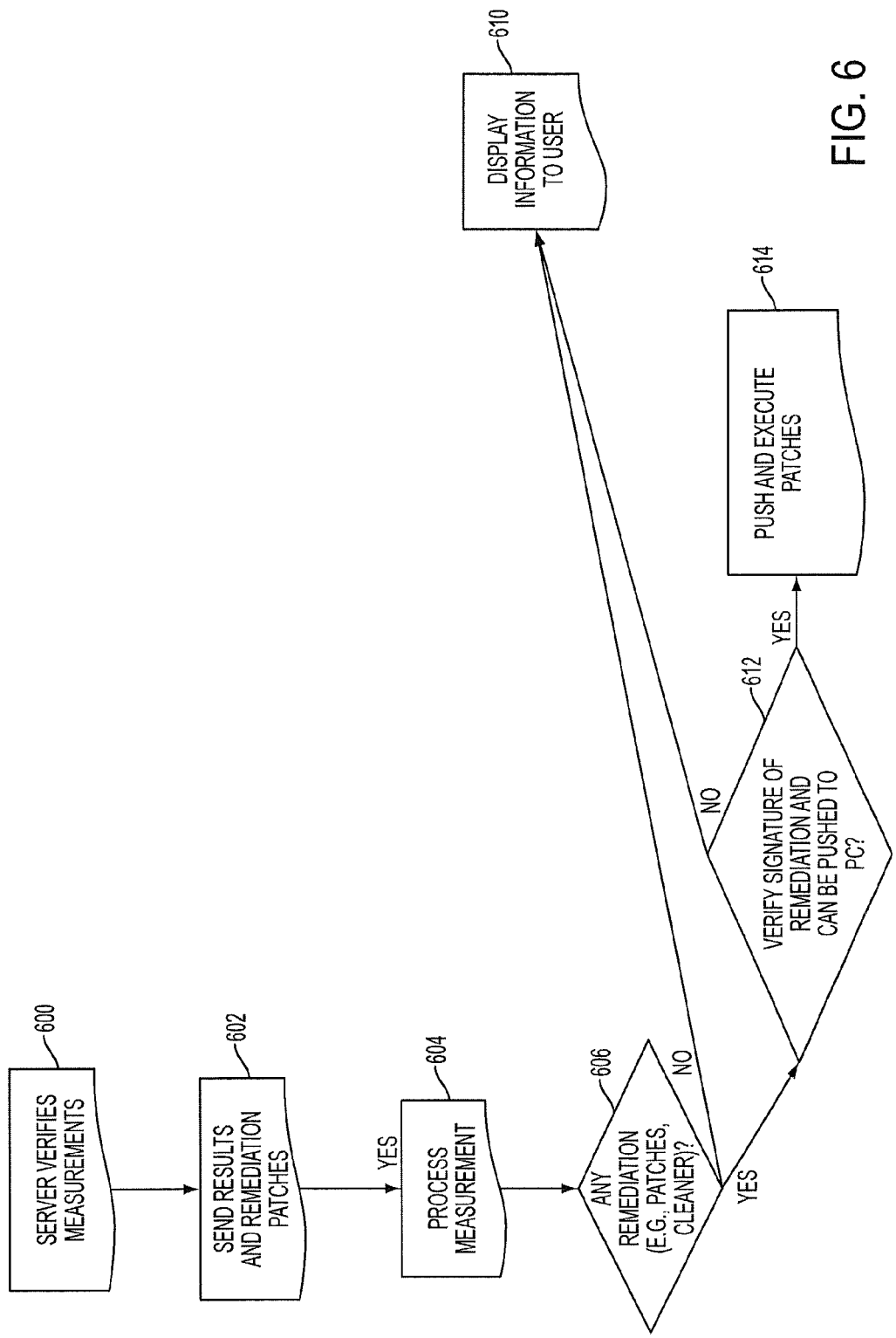

FIGS. 4-6 are flow charts of diagnosing a target platform 100 with an external hardware trust anchor device, according to an embodiment of the present invention. In the example flow charts, a target virtualized software environment 102 of the target platform 100 and only the collection of a measurement of the target platform 100 is described as a security audit of the target platform 100, however, the embodiments are not limited to virtualized software environments 102 and collection of measurements of the target platform 100 as a security audit, but as discussed herein the hardware trust anchor device 200 can verify the health or trust state of a target real software environment 102 and can execute other security audit operations in relation to the target platform 100 including the target software environment 102. In other words, the embodiments are not limited to measurement collection for security diagnosis, and any diagnostic information that includes security diagnostic information can be collected.

In FIG. 4 at operation 400, a hardware trust anchor (HTA) 200 is activated for the target computing environment 100, for example, plugged into the target computing environment or target PC 100. At 404, it is determined whether the HTA can perform a security audit of the target platform 100, for example, by receiving and/or actively (directly) collecting measurements of the target machine 100. If at 404, measurements cannot be collected, at 406, the target platform 100 verification fails, and at 408 such diagnostic result is displayed on the display 802 of the HTA 200. If at 404, measurements can be collected, at 410 the measurements are received by the HTA 200 and the HTA 200 checks the source of the measurements. At 410, it is determined whether the measurements were collected by TPM 814b of the target platform 100, and if so, at 416, the TPM attestation key is verified. If the measurement source is other than TPM 814b, at 417, the signature of the measurements are verified. At 418, such a signature verification result is displayed for the user on the display 802 of the HTA 200. At 420, it is determined whether the signature verification of the measurement is correct. If at 420, the signature of the measurement cannot be verified, at 408, a failed messaged is displayed. If, at 420, the signature of the measurement is verified, the security audit continues continue at 500 to verify the measurement in FIG. 5. If at 500, the measurement verification is successful, at 418, the success is displayed to the user. If, at 500, the measurement verification fails, at 432 failed measurement verification result is displayed to the user.

In FIG. 5, at 500, the HTA determines whether the measurement can or should be verified internally. If, for example, the HTA 700 has an OOB connection 714 to a server 710, the security audit continues in FIG. 6 at 600. If the HTA 200 internally verifies the measurements, at 502, the HTA 200 verifies received measurement internally. For example, at 502, if the measurement indicates changes to a particular file or area of memory/storage device, then such indication is used for troubleshooting and/or remediation. At 506, it is determined whether the target platform 100 requires any remediation. If determined at 506 that remediation is required, at 508, it is determined whether there is any patch/cleaner software/data as remediation, and if so, at 510 it is determined whether the patch/cleaner can be pushed to the target platform 100. At 512, the patch/cleaner is pushed to the target platform 100 and executed. At 504, results of patch/cleaner availability and/or whether remediation is possible by pushing the patch/cleaner to the target platform 100, is displayed for the user on a display 802 of the HTA 200.

In FIG. 6, at 600 the server 710 verifies the measurements and/or the signature verification result of the measurement (as the case may be) sent to the remote server 710. The server 710 verifies the measurements (e.g., by using a signature when available from the TPM 814b, etc.) and at 602, sends the results and/or remediation and/or patches to HTA 200. At 604, the OOB HTA 700 processes measurement verification results and/or remediation received from the server 710. At 606, the HTA 700 determines whether there are any available remediation, such as patches and/or cleaner software, etc., and if so, at 612, a signature of such a patch/cleaner is verified. At 610, a result of verification at 612 and/or whether at 606 there are any patch/cleaner is displayed for the user on display 802 of the HTA 700. At 612, it can also be determined whether a patch/cleaner can be pushed onto the target platform 100, and if so, at 614 the patch/cleaner is pushed to the target platform 100 and executed. If the patch/cleaner cannot be pushed to the target platform 100, at 610, such a result is displayed for the user on display 802 of the HTA 700.

Figure 7:
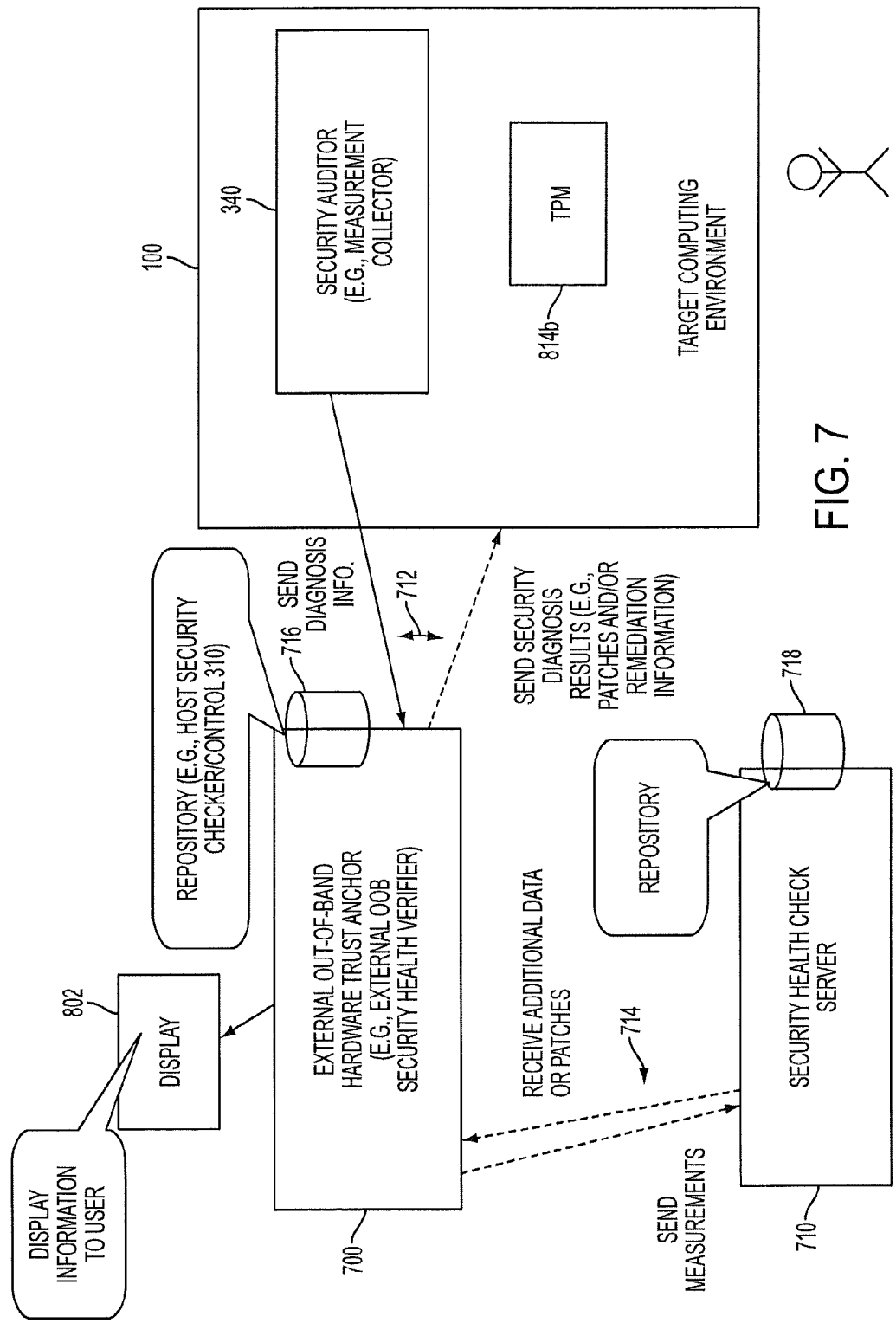
FIG. 7 of diagnosing a target computer with an external out-of-band hardware trust anchor device, according to an embodiment according to an embodiment of the invention.

FIG. 7 is a diagram of a computer system according to an embodiment of the invention. In FIG. 7, an external out-of-band (OOB) hardware trust anchor 700 verifies and maintains security health of a target computing environment 100. The OOB device 700 is inserted into and/or communicably connected to the target computer 100, and the target computer 100 launches a security auditor 340, for example, an internal measurement collection program for collecting the state of the target platform 100. One alternative method is for the target system 100 to launch a security auditor 340 that is hosted in the OOB hardware trust anchor device 700, for example, by masking the device 700 as a storage device (e.g., a CD-ROM, USB device, etc.) and execute the security auditor 340.

Another alternative is for the OOB hardware trust anchor 700 itself starts a security auditor 310 that can directly collect the state of the target system 100. This is possible with connectors such as FIREWIRE that have demonstrated capabilities for direct access to target system 100 memory and resources.

After this, the target system 100 under verification sends the collected data to the portable device 700 or the data is collected by the portable device 700 (as the case may be). The portable device 700 will verify the results, by a host security diagnostic software 310 and/or in cooperation with health check server 710, and suggest remediation to the user using its own display mechanism. For example, the display 802 in the portable device 700 can show "You have two viruses." The notification should be clear so even novice users could clearly understand the state of the target system 100 under verification and the necessary steps to remediate the reported problems.

In FIG. 7, the OOB hardware trust anchor 700 is in wire or wireless network 712 communication with the target computing environment (e.g., a PC) 100 and controls security diagnosis of the target computing environment 100. Out-of-band (OOB) refers to a computing environment independent or exclusive of a target computing environment 100. According to an aspect of an embodiment, OOB includes an OOB network connection, which is another network connection to connect to a remote device 710 and independent or exclusive of a network connection used by the target computing environment 100. According to an aspect of an embodiment, security diagnosis refers to any diagnosis related to operation of a computing environment, including (without limitation) malicious software detection/anti malicious software procedures, computing environment configuration/setting/properties management (retrieval, setting, analysis), measurement of computing environment, etc.

According to an aspect of an embodiment, the OOB hardware trust anchor 700 is an out-of-band security health check verifier or security diagnoser, which can be an external security diagnostic computing device, for example, a handheld computing device security health check verifier 700, which is configured to output information, for example, via a display 802, and configured to wire or wireless network 714 communicate out-of-band (OOB) in relation to the target machine 100, with a another computing apparatus/device 710. In most cases, this will be an offload for the health check verifier 700, to prevent tampering and trickery from malicious software, for example, a virus. In other words, the external OOB connection 714 is not related to or is exclusive of the target machine's network connection 712. In no case the out-of-band diagnoser, for example, external diagnostic device (e.g., handheld diagnostic device) 700 can be affected by the state of the target machine 100. According to an aspect of an embodiment, the out-of-band diagnoser 700 is trusted.

Using an external diagnostic device as a nonlimiting example, a portable OOB security verifier or security diagnostic device 700 with user interaction capabilities (integrated display, etc.) is connected to a target platform 100 using an exiting connector 712, such as USB or FIREWIRE. Typical OOB security verifier devices 700 are the ones that the user is more likely to trust, such as an IPOD or cell phones, and/or have been verified to be trusted. For example, IPOD or a mobile phone might be deemed a trusted device, for example, by a user 106, by having a higher network isolation characteristic in relation to the target machine 100, for example, a desktop computer 100.

The OOB security verifier device 700 may include the required diagnosis software, namely anti-malicious software, measurement collector, etc., already stored in a repository (computer readable recording media) 716 of the OOB security verifier device 700, or the OOB security verifier device 700 can first download some stored security health check software 310 via the OOB connection 714 from the security health check server 710 that provides the security health check capabilities. As an alternative, an anti-virus vendor might sell the anti-virus software for the OOB security verifier device 102 as part of the anti-virus software.

As an alternative, a single-purposed external and/or internal hardware 200, 700 can be designed and used for verifying or diagnosing the security health of the target system 100 where it is plugged or in which it is activated. This will work like a "digital thermometer" of the target system 100, much in the same fashion that fever is measured to look for diseases in humans.

According to an aspect of an embodiment the collected data can come either from trusted sources, such as an embedded black box (e.g. TPM 814) or from untrusted sources, such as software 310, 340 running in the system whose result might be tampered by malicious software (e.g., malware, virus). The portable device 200, 700 can provide the user with estimation on confidence of these security diagnostics depending on the mechanism it uses to collect the information. For example, if the results are backed by a trusted hardware such a TPM 814, it can show "very high confidence" along the results. If the results come from a virtual machine monitor/manager 330, it can display "high confidence". If the results are provided by the host security checker 310 and/or security auditor 340 in cooperation with off the shelf antivirus software, it can show "low confidence", and so on.

There exist different techniques to verify the quality of the data source. Embedded devices, such as a TPM 814, can sign the report using certified private keys. This will demonstrate the integrity of the report itself to the security verifier device 200, 700. If the host security checker 310 and the security auditor 340 come from the same source (such as in the case the anti-virus vendor provides both) both programs can authenticate each other by means of keyed hashes, such as HMAC. In this case, the host security checker software 310 in charge of controlling collection and/or collecting security data from the target host 100 will create a keyed hash of the report using a pre-shared key between the software running 340 in the host 100 and the software 310 running in the security verifier device 200, 700. Hence, the software 310 in the security verifier device 200, 700 could verify the validity of the report by recreating the keyed hash. In general, any cryptographic verification technique (HMAC, signing keys) can be used by the target host computer 100 to demonstrate trust to the receiving security verifier device 200, 700.

According to an aspect of an embodiment, if the portable security verifier device is a portable OOB security verifier device 700 that has external connection capabilities (such as WIFI, or cellular network), the final verification can be done in a remote server 710 too, and remediation tools, such as malware cleaners, can be downloaded in the verifier device 700 and later pushed into the target system 100 under verification. This works much in the same fashion as a doctor providing pills to a patient once a diagnostics is provided.

According to an aspect of an embodiment, the hardware trust anchor or security diagnoser device 200, 700 performs combinations of diagnosis depending upon accessibility determination to the target computing environment and guides the user actions. The hardware trust anchor operations include one or more diagnostic actions of (1) upon being recognized by diagnostic information collector 340 in the target environment 100, the hardware trust anchor 700 receives diagnostic information (e.g., collect information on memory, operating system, initialization/registry files, storage device, measurements of files for detecting changes in the files, etc.) for analysis (detection of changes in files, malicious software detection, etc.)/remediation based thereon; (2) if the hardware trust anchor can be recognized as a storage device, execute a diagnostic information collector 340; (3) if the target environment 100 operating system is determined to be corrupted or not operational, reboot the target environment 100 with another operating system to collect information of the target environment; (4) in response to a failed OS of the target computing environment 100 or otherwise, install and/or utilize a pre-installed virtual machine monitor/manager (VMM) on the target environment 100 to launch a virtual machine (VM) collecting the diagnostic information; (5) in the event the VM is infected, control/manage the VMM as a diagnostic information collector 340 to diagnose the VM, because the VMM has access to all information supporting execution of the VM; and (6) in the event if the target environment 100 operating system is determined to be corrupted or not operational, establish a connection that directly collects the state of the target system 100, such as memory, resources, files, device, etc., for example, FIREWIRE, etc.

Any combinations of diagnostic actions are performed. According to an aspect of an embodiment, the hardware trust anchor interactively guides the user through the diagnostic actions, according to diagnostic information of the target computing environment 100 and/or remediation information received from the OOB connection 714 (as the case may be). According to an aspect of an embodiment, the hardware trust anchor is exclusive or independent by not executing anything from the target computing environment 100 or only executing host security checker software 310, providing a benefit of being protected from infections from the target computing environment 100. According to an aspect of an embodiment, the hardware trust anchor is read-only. According to an aspect of an embodiment, the hardware trust anchor is a read-only virtual machine. There are several ways to achieve this read-only feature of the hardware trust anchor, namely implement the hardware trust anchor as a VM, and certain VMMs support this read-only function by restoring the VM images back to initial state after turning off the VMM, and/or controlled via the file system by, for example, before launching the VM image, creating a snapshot of the VM image, and after turning off the VMM, restore to the snapshot. Or in case the hardware trust anchor is an external computing device, set the device as read-only or non-writable.

Common users are afraid to even touch their computer once they believe the computer has been infected by a virus. Splashing screens and other malware techniques reduce user confidence in the infected system. A benefit of the embodiments, that verification with the aid of an out-of-band external device is more likely to provide non-technical users with confidence that the diagnostic is correct, and will also help on ensuring the user understand the necessary operations for remediation. Further, if the user uses an out-of-band external device which is highly trusted, such as an IPOD or a Phone (e.g., a mobile phone) to provide the system diagnostics and remediation, the user is more likely to clean the system by performing the suggested actions, making it easy and convenient to repair the system.

According to an aspect of an embodiment, the external hardware in-band trust anchor is a handheld device health check ('trust state') verifier configured to output information, for example, via a display, and configured to in-band security audit the target computing system without another communication connection in relation to previously or existing established communication with the target machine. In most cases, this will be an offload for the health check verifier, to prevent tampering and trickery from virus. The embodiments substantially ensure that the external hardware in-band trust anchor (e.g., handheld OOB diagnostic device) cannot be affected by the state of the target machine.

According to an aspect of an embodiment, the external hardware OOB trust anchor is a handheld device health check ('trust state') verifier configured to output information, for example, via a display, and configured to wire or wirelessly communicate out-of-band (OOB connection), which is an independent communication in relation to or exclusive of a previously or existing established communication with the target machine, with another computing apparatus/device and OOB security audit the target computer machine. In most cases, this will be an offload for the health check verifier, to prevent tampering and trickery from virus. In other words, the OOB connection is not related to or is independent of and/or exclusive of the target machine's connection with a network. The embodiments substantially ensure that the external hardware OOB trust anchor (e.g., handheld in-band diagnostic device) cannot be affected by the state of the target machine.

In case of the external hardware OOB trust anchor, a benefit is use of a familiar device, such as an IPOD, as an external hardware OOB diagnostic device to verify and display the results of any diagnosis of a target computing environment, for example, antivirus collection, providing information related to a 'trust state' of the target computing environment, and suggest or implement remediation techniques. A benefit of the embodiments is OOB diagnosis of the target computing environment when the network connection of the target computing environment is disabled and/or not functioning, for example, because of malicious software. According to an aspect of an embodiment, the external hardware OOB diagnostic device performs combinations of diagnosis depending upon accessibility determination to the target computing environment.

Other example benefits of the embodiments for target virtualized machines can be as follows. 1. a general architecture for securing virtual machines based on a hardware trust anchor. The security problems of mobile virtual machines are addressed while remaining flexible in possible implementations, since the hardware trust anchor can be embodied in different candidate mobile devices, such as a mobile/portable computer, a USB drive with a CPU, a mobile phone, or a specifically designed device. 3. a practical user experience is provided, stressing the practicality of the embodiments, by providing an embodiment based upon a hardware trust anchor in a specialized single purpose embedded device, created drivers and software for communication between the target virtual machine and the hardware trust anchor, and modifications to a virtual machine monitor, for example, the XEN virtual machine monitor to improve both its security and usability.

Figure 8:
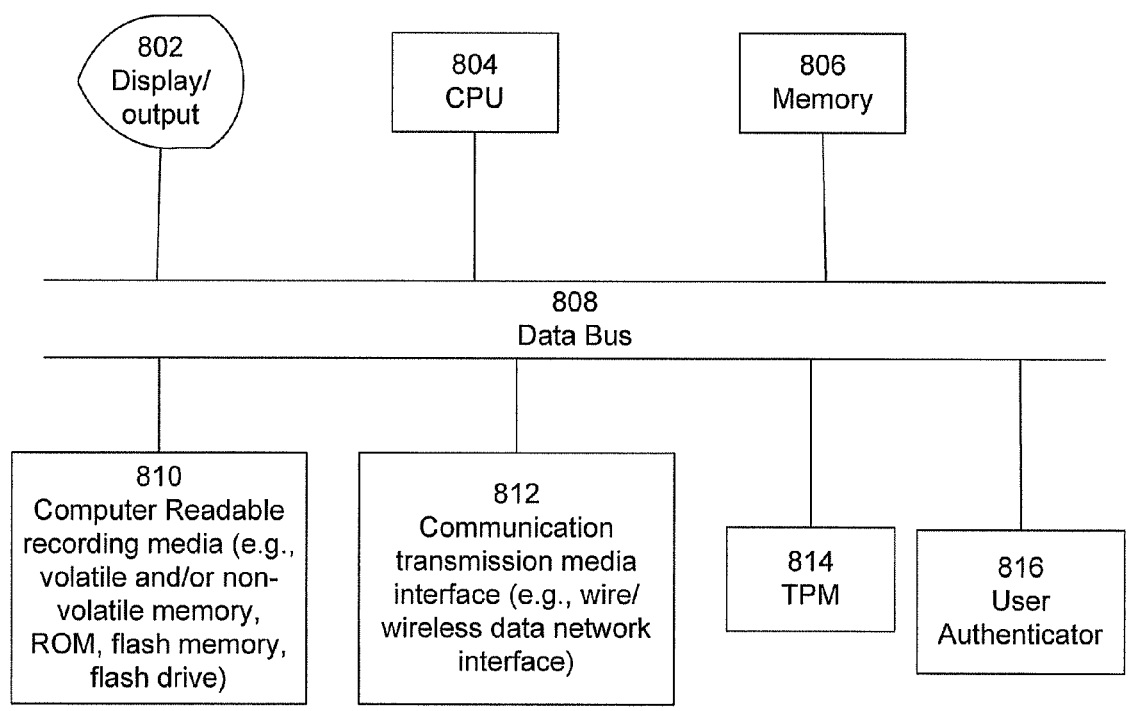
FIG. 8 is a functional block diagram of a computer for the embodiments of the invention.

FIG. 8 is a functional block diagram of a computer for the embodiments of the invention, namely the computer is an example of an external hardware trust anchor device 200 as the health check verifier. Further, the computer can be an example of a target machine or target computing environment 100. In FIG. 8, the computer can be any computing device. Typically, the computer includes a display or output unit 802 to display a user interface or output information or indications, such as a diode. A computer controller 804 (e.g., a hardware central processing unit) executes instructions (e.g., a computer program or software) that control the apparatus to perform operations. Typically, a memory 806 stores the instructions for execution by the controller 804. A Trusted Platform Module (TPM) 814 can be provided. According to an aspect of an embodiment, the apparatus reads/writes/processes data of any computer readable recording media 810 and/or communication transmission media interface 812. The user authenticator 816 can be finger print/palm sensor, or other software/computing hardware for authenticating a user. The display 802, the CPU 804 (e.g., hardware logic circuitry based computer processor that processes instructions, namely software), the memory 806, the computer readable media 810, the communication transmission media interface 812, TPM 814 and user authenticator 816 are in communication by the data bus 808. Any results produced can be displayed on a display of the computing hardware.

Therefore, according to an aspect of the embodiments of the invention, any combinations of one or more of the described features, functions, operations, and/or benefits can be provided. A combination may include only one or may include two or more. The embodiments can be implemented as an apparatus (a machine) that includes computing hardware (i.e., computing apparatus), such as (in a non-limiting example) any computer that can store, retrieve, process and/or output data and/or communicate (network) with other computers. In addition, an apparatus can include one or more apparatuses in computer network communication with each other or other apparatuses. In addition, a computer processor can include one or more computer processors in one or more apparatuses or any combinations of one or more computer processors and/or apparatuses. An aspect of an embodiment relates to causing one or more apparatuses and/or computer processors to execute the described operations. The results produced can be displayed on the display.

A program/software implementing the embodiments may be recorded on computer-readable recording media. Examples of the computer-readable recording media include a magnetic recording apparatus, an optical disk, a magneto-optical disk, and/or volatile and/or non-volatile semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), DVD-ROM, DVD-RAM (DVD-Random Access Memory), BD (Blue-ray Disk), a CD-ROM (Compact Disc-Read Only Memory), and a CD-R (Recordable)/RW.

The program/software implementing the embodiments may also be included/encoded as a data signal and transmitted over transmission communication media. A data signal moves on transmission communication media, such as wired network or wireless network, for example, by being incorporated in a carrier wave. The data signal may also be transferred by a so-called baseband signal. A carrier wave can be transmitted in an electrical, magnetic or electromagnetic form, or an optical, acoustic or any other form.]

All examples and conditional language recited herein are intended for pedagogical objects to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A method of securing a target computing device, comprising:
communicably activating, for the target computing device, an external out-of-band hardware trust anchor, the hardware trust anchor being out-of-band in relation to the target computing device;
establishing, by the hardware trust anchor, a trust state of the target computing device, based upon a binding of the hardware trust anchor to a computing environment of the target computer device by:
launching, by the hardware trust anchor, a virtual machine of the target computing device on the target computing device,
obtaining security diagnostic information based upon measuring the target computing device including the launched virtual machine and changing a trust state of the virtual machine to a trusted virtual machine according to a verified measurement of the target computing device, and
continuously maintaining, by the hardware trust anchor, the trust state of the target computing device based upon a security policy of enforcing assignment of the hardware trust anchor to the trusted virtual machine that forbids other launched computing environments from communicating with the hardware trust anchor.

2. The method according to claim 1, wherein the security policy comprises limiting modification of the trusted virtual machine and/or limiting execution in the trusted virtual machine to a target process.

3. The method according to claim 1, wherein the continuous maintaining of the trust state of the target computing device comprises providing a live feedback of the trust state to a user.

4. The method according to claim 3, wherein the live feedback comprises providing information of launched applications in the target computing device.

5. The method according to claim 1, wherein the continuously maintaining of the trust state of the target computing device comprises:
establishing an out-of-band communication with a server; and
maintaining the trust state of the target computing device, including performing security diagnosing and executing a security remediation process for restoring the trust state, in cooperation with the server.

6. An apparatus for securing a target computing device, comprising:
a computer processor executing:
establishing an external out-of-band communication with a hardware trust anchor the hardware trust anchor being out-of-band in relation to the target computing device; and
establishing a trust state of the target computing device based upon a binding of the hardware trust anchor to a computing environment of the target computer device by:
launching a virtual machine of the target computing device on the target computing device,
obtaining security diagnostic information based upon measuring the target computing device including the launched virtual machine and changing a trust state of the virtual machine to a trusted virtual machine according to a verified measurement of the target computing device, and continuously maintaining the trust state of the target computing device based upon a security policy of enforcing assignment of the hardware trust anchor to the trusted virtual machine that forbids other launched computing environments from communicating with the hardware trust anchor.

7. A method, comprising:

configuring an external out-of-band hardware trust anchor, the hardware trust anchor being out-of-band in relation to a target computing device, to execute:

verifying the target computing device based upon a measurement of the target computing device;

establishing in the verified computing device a trusted computing base (TCB) including launching a virtual machine of the target computing device on the target computing device and measuring the launched virtual machine to change a trust state of the virtual machine to a trusted virtual machine; and continuously maintaining a trust state of the target computing device by binding the hardware trust anchor to the trusted virtual machine of the TCB according to a security policy of enforcing assignment of the hardware trust anchor to the trusted virtual machine that forbids other launched computing environments from communicating with the hardware trust anchor.

* * * * *